(12) United States Patent
Wang et al.

(10) Patent No.: US 10,872,327 B2
(45) Date of Patent: Dec. 22, 2020

(54) MOBILE PAYMENT SYSTEMS AND MOBILE PAYMENT METHODS THEREOF

(71) Applicant: Huizhou TCL Mobile Communication Co., Ltd., Guangdong (CN)

(72) Inventors: Jia Wang, Guangdong (CN); Yanshun Guo, Guangdong (CN)

(73) Assignee: HUIZHOU TCL MOBILE COMMUNICATION CO., LTD., Guangdong (CN)

(*) Notice: Subject to any disclaimer, the term of this patent is extended or adjusted under 35 U.S.C. 154(b) by 810 days.

(21) Appl. No.: 15/107,092

(22) PCT Filed: Oct. 20, 2015

(86) PCT No.: PCT/CN2015/092276
§ 371 (c)(1),
(2) Date: Jun. 21, 2016

(87) PCT Pub. No.: WO2016/176967
PCT Pub. Date: Nov. 10, 2016

(65) Prior Publication Data
US 2017/0140372 A1    May 18, 2017

(30) Foreign Application Priority Data

May 6, 2015    (CN) .................... 2015 1 02280641

(51) Int. Cl.
*G06Q 20/32*      (2012.01)
*G06Q 20/40*      (2012.01)
*G06Q 20/38*      (2012.01)

(52) U.S. Cl.
CPC ....... *G06Q 20/3226* (2013.01); *G06Q 20/327* (2013.01); *G06Q 20/4014* (2013.01); *G06Q 20/32* (2013.01); *G06Q 20/3829* (2013.01)

(58) Field of Classification Search
CPC ......... H04W 12/06; H04W 4/80; G06F 21/35; G06F 1/163; G06F 21/44; G06Q 20/327;
(Continued)

(56) References Cited

U.S. PATENT DOCUMENTS

2002/0107054 A1* 8/2002 Fujisawa ................ G04G 21/04
455/573
2006/0270348 A1* 11/2006 Ibrahim ................ H04B 1/3805
455/41.2

(Continued)

FOREIGN PATENT DOCUMENTS

| CN | 102945526 A | 2/2013 |
|---|---|---|
| CN | 103927651 A | 7/2014 |

(Continued)

*Primary Examiner* — Christopher Stanford
(74) *Attorney, Agent, or Firm* — Leong C. Lei

(57) ABSTRACT

Mobile payment systems and associated mobile payment methods are disclosed. A mobile payment system may include a wearable device and a mobile device wirelessly connected to the wearable device. The mobile device may transmit a payment instruction to the wearable device, which may verify whether the user's identity information is correct according to the payment instruction. If the user's identity information is correct, the wearable device may generate a payment-permitted instruction and encrypt the payment-permitted instruction by a secret key. The wearable device may transmit the encrypted payment-permitted instruction to the mobile device, which may perform decryption on the encrypted payment-permitted instruction, if the mobile device can correctly decrypt the encrypted payment-permitted instruction, the mobile device can make a payment. Thus, the present disclosure can improve the security of the payment information in mobile payment.

12 Claims, 2 Drawing Sheets

(58) Field of Classification Search
CPC .... G06Q 20/3278; G06Q 20/20; G06Q 20/32; G06Q 20/3226; G06Q 20/40
See application file for complete search history.

(56) References Cited

U.S. PATENT DOCUMENTS

| | | | | |
|---|---|---|---|---|
| 2009/0248932 | A1* | 10/2009 | Taylor | G06F 13/24 710/110 |
| 2013/0009756 | A1* | 1/2013 | Lu | G06Q 20/3278 340/10.42 |
| 2014/0282878 | A1* | 9/2014 | Ignatchenko | H04L 63/08 726/3 |
| 2015/0005656 | A1* | 1/2015 | Lee | A61B 5/0245 600/523 |
| 2015/0035643 | A1* | 2/2015 | Kursun | G07C 9/00134 340/5.52 |
| 2015/0073983 | A1* | 3/2015 | Bartenstein | G06Q 20/3415 705/41 |
| 2015/0135284 | A1* | 5/2015 | Bogard | G06F 21/35 726/5 |
| 2015/0149310 | A1* | 5/2015 | He | G06Q 20/40145 705/21 |
| 2015/0161371 | A1* | 6/2015 | Hoshi | G06F 21/35 726/19 |
| 2015/0286813 | A1* | 10/2015 | Jakobsson | G06F 21/35 726/9 |
| 2016/0086176 | A1* | 3/2016 | Silva Pinto | G06Q 20/401 705/44 |
| 2016/0094525 | A1* | 3/2016 | Lin | H04W 12/02 713/171 |
| 2016/0379205 | A1* | 12/2016 | Margadoudakis | G06Q 20/327 705/71 |

FOREIGN PATENT DOCUMENTS

| | | |
|---|---|---|
| CN | 104200143 A | 12/2014 |
| CN | 104331796 A | 2/2015 |
| CN | 104484799 A | 4/2015 |

* cited by examiner

MOBILE PAYMENT SYSTEMS AND MOBILE PAYMENT METHODS THEREOF

FIELD OF THE DISCLOSURE

The present disclosure relates to mobile payment technologies, and more particularly, to mobile payment systems and mobile payment methods thereof.

BACKGROUND OF THE DISCLOSURE

Mobile payment generally refers to payment services performed from or via a mobile device (e.g., a mobile phone) for a wide range of goods or services, Mobile payment has advantages of simplicity, convenience, and speediness. The biggest drawback of mobile payment would be the security risk of the user's payment information, which means that if the user's mobile device gets lost, his mobile payment system and relevant payment information would be unauthorizedly used, which may cause a huge loss to the user.

SUMMARY OF THE DISCLOSURE

Mobile payment systems and associated mobile payment methods are disclosed, which aim at improving the payment information security in mobile payment.

According, to a first aspect of the disclosure, a mobile payment system is disclosed. The mobile payment system may comprise a wearable device and a mobile device wirelessly connected to the wearable device. The mobile device may comprise a first processing module, a first communication module and an ASK (Amplitude-shift keying) receiving module that are connected to the first processing module. The first processing module may transmit through the first communication module a payment instruction to the wearable device.

The wearable device may comprise: a second communication module configured to receive the payment instruction from the first communication module; a second processing module connected to the second communication module and configured to verify whether a user's identity information is correct according to the payment instruction, if positive, the second processing module may generate a payment-permitted instruction, and encrypt the payment-permitted instruction by a secret key; and a carrier transmission module connected to the second processing module and configured to transmit the encrypted payment-permitted instruction to the mobile device.

The ASK receiving module may receive from the carrier transmission module the encrypted payment-permitted instruction. The mobile device may perform decryption on the encrypted payment-permitted instruction, if the encrypted payment-permitted instruction can be decrypted correctly, the mobile device may make a payment.

If the user's identity information is verified to be incorrect according to the payment instruction, the second processing module may generate a payment-not-permitted instruction. The second communication module may transmit the payment-not-permitted instruction to the mobile device.

The carrier transmission module may comprise an interrupt pin, through which the second processing, module can awaken the carrier transmission module.

The carrier transmission module may transmit the encrypted payment-permitted instruction to the ASK receiving module using a low frequency signal of 125 KHz.

The ASK receiving module may comprise: a receiver chip connected to the first processing module and configured to transfer the encrypted payment-permitted instruction to the first processing module for decryption; a clock circuit connected to the receiver chip and configured for time synchronization; and an antenna connected to the receiver chip and configured to receive the encrypted payment-permitted instruction.

When the ASK receiving module receives the encrypted payment-permitted instruction, the receiver chip may awaken the first processing module.

According to a second aspect of the disclosure, a mobile payment system is also disclosed. The mobile payment system may comprise a wearable device and a mobile device wirelessly connected to the wearable device. The mobile device may transmit a payment instruction to the wearable device, which may verify whether a user's identity information is correct according to the payment instruction. If the user's identity information is correct, the wearable device may generate a payment-permitted instruction and encrypt the payment-permitted instruction by a secret key. The wearable device may further transmit the encrypted payment-permitted instruction to the mobile device, which may perform decryption on the encrypted payment-permitted instruction, if the encrypted payment-permitted instruction can be decrypted correctly, the mobile device may make a payment.

The mobile device may comprise a first processing module and a first communication module connected to the first processing module. The first processing module may transmit through the first communication module a payment instruction to the wearable device.

The wearable device may comprise: a second communication module configured to receive the payment instruction from the first communication module; a second processing module connected to the second communication module and configured to verify whether the user's identity information is correct according to the payment instruction, if positive, the second processing module may generate a payment-permitted instruction and encrypt the payment-permitted instruction by a secret key; and a carrier transmission module connected to the second processing module and configured to transmit the encrypted payment-permitted instruction to the mobile device.

The mobile device may further comprise an ASK (Amplitude-shift keying) receiving module connected to the first processing module and configured to receive the encrypted payment-permitted instruction from the carrier transmission module.

The first processing module may perform decryption on the encrypted payment-permitted instruction. If the payment-permitted instruction can be correctly decrypted, the mobile device may make a payment.

The carrier transmission module may transmit the encrypted payment-permitted instruction to the ASK receiving module using a low frequency signal of 125 KHz.

If the user's identity information is verified to be incorrect according to the payment instruction, the second processing module may generate a payment-not-permitted instruction. The second communication module may transmit the payment-not-permitted instruction to the mobile device.

According to a third aspect of the disclosure, a mobile payment method is also disclosed and can be applied to a mobile payment system comprising a wearable device and a mobile device wirelessly connected to the wearable device. The method may comprise: transmitting, by the mobile device, a payment instruction to the wearable device, which may verify whether a user's identity information is correct according to the payment instruction; if the user's identity information is correct, generating, by the wearable device, a payment-permitted instruction, and encrypting the payment-permitted instruction by a secret key; and transmitting, by the wearable device, the encrypted payment-permitted instruction to the mobile device, which may perform decryption on the encrypted payment-permitted instruction, if the payment-permitted instruction can be correctly decrypted, the mobile device can make a payment.

If the user's identity information is verified to be incorrect according to the payment instruction, then the wearable device may generate a payment-not-permitted instruction. The wearable device may transmit the payment-not-permitted instruction to the mobile device.

If the mobile device receives the payment-not-permitted instruction or a decryption error occurs, the mobile device may terminate the payment.

The wearable device may transmit the encrypted payment-permitted instruction to the mobile device using a low frequency signal of 125 KHz.

Advantages of the present disclosure may follow. According to the disclosure, the mobile device can transmit a payment instruction to the wearable device, which may verify whether the user's identity information is correct; if positive, the wearable device can generate a payment-permitted instruction and encrypt the payment-permitted instruction by a secret key; the wearable device can further transmit the encrypted payment-permitted instruction to the mobile device, which can then attempt to decrypt the encrypted payment-permitted instruction, if the payment-permitted instruction can be correctly decrypted, the mobile device can make a payment. Thus, the present disclosure can effectively enhance the security of payment information in mobile payment.

BRIEF DESCRIPTION OF THE DRAWINGS

To more clearly illustrate the technical implementations of the disclosure, a brief description of the accompanying drawings will be rendered below. Apparently, the following accompanying draws depict merely some embodiments of the disclosure, and those of ordinary skill in the art can obtain other drawings without making inventive efforts based on these accompanying drawings, in which.

DETAILED DESCRIPTION OF THE DISCLOSURE

Hereinafter, technical implementations of the disclosure will be described in definite and comprehensive details with reference to the accompanying drawings. Obviously, the embodiments described below are only some but not all the embodiments of the disclosure. All other embodiments obtained by those of ordinary skill in the art based on the embodiments of the disclosure without making inventive efforts shall all fall within the protection of the disclosure.

Figure 1:
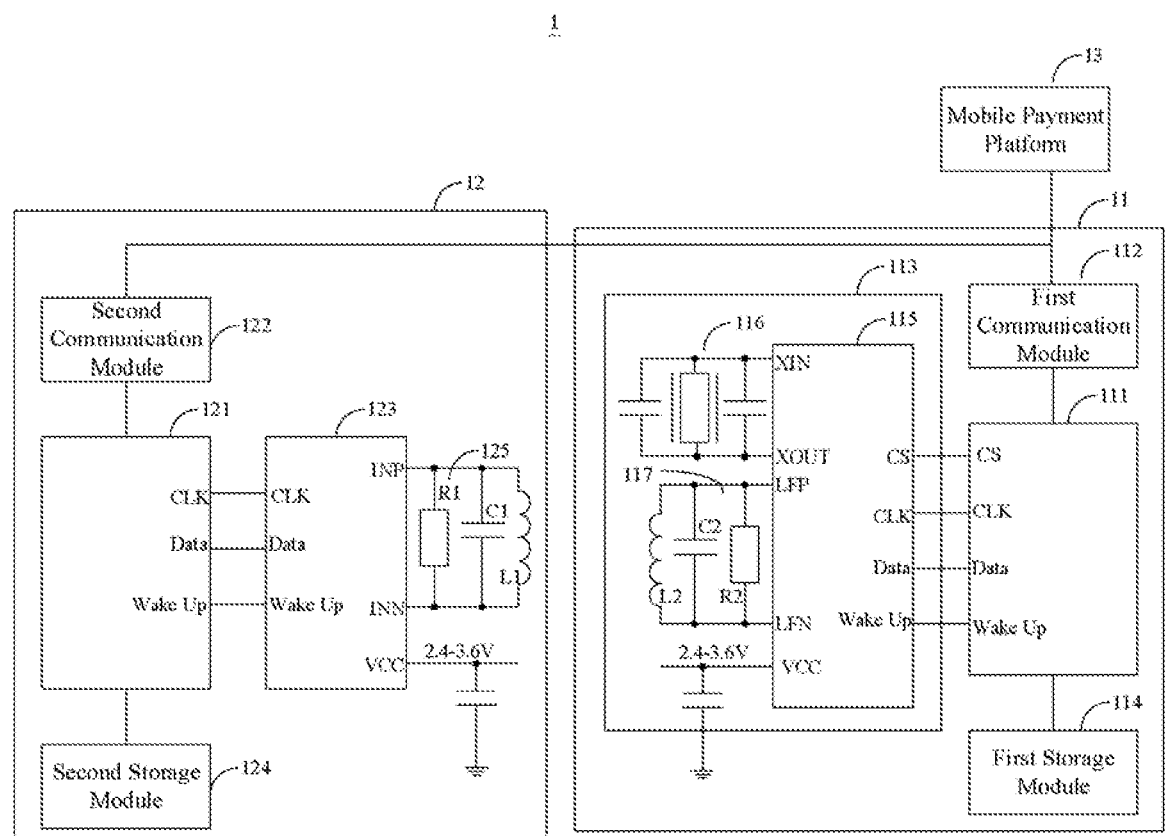
FIG. 1 shows a block diagram of a mobile payment system according to an embodiment of the disclosure.

FIG. 1 is a block diagram of a mobile payment system according to an embodiment of the disclosure. The mobile payment system 1 may comprise a mobile device 11 and a wearable device 12 wirelessly connected to the mobile device 11.

The mobile device 11 may comprise a first processing module 111, a first communication module 112, an ASK (Amplitude-shift keying) receiving module 113, and a first storage module 114. The first communication module 112, the ASK receiving module 113, and the first storage module 114 may be each connected to the first processing module 111. The wearable device 12 may comprise a second processing module 121, a second communication module 122, a carrier transmission module 123, and a second storage module 124. The second communication module 122, the carrier transmission module 123, and the second storage module 124 may be each connected to the second processing module 121. Both the first and the second storage module 114 and 124 may be stored with a user's payment information. Typically, both the first and the second communication module 112 and 121 may be BLE (Bluetooth Low Energy) modules or BT (Bluetooth) modules.

When the user uses the mobile device 11 to initiate a mobile payment, the mobile device 11 may transmit a payment instruction to the wearable device 12. Specifically, the first processing module 111 of the mobile device 11 may transmit through the first communication module 112 the payment instruction to the wearable device 12. The second communication module 122 of the wearable device 12 may receive the payment instruction and generate an interrupt signal to awaken the second processing module 121. The second processing, module 121 may acquire the payment instruction from the second communication module 122, and verify whether the user's identity information is correct according to the payment instruction Namely, the second processing module 121 may compare the user identity information present in the payment instruction against the payment information stored in the second storage module 124. If the user's identity information is verified to be incorrect, the second processing module 121 may generate and transmit through the second communication module 122 a payment-not-permitted instruction to the mobile device 11, such that the mobile device 11 may not be permitted to make a payment. If the user's identity information is verified to be correct, the second processing module 121 may generate a payment-permitted instruction and encrypt the payment-permitted instruction by a secret key. The carrier transmission module 123 may transmit the encrypted payment-permitted instruction to the mobile device 11. Typically, the carrier transmission module 123 may transmit the encrypted payment-permitted instruction to the mobile device 11 using a low frequency signal of 125 KHz.

The carrier transmission module 123 may be connected to the second processing module 121 via an I2C interface, specifically, an CLK (clock) interface of the carrier transmission module 123 may be connected to an CLK interface of the second processing module 121; a Data interface of the carrier transmission module 123 may be connected to a Data interface of the second processing module 121; and a Wake-Up interface of the carrier transmission module 123 may be connected to a Wake-Up interface of the second processing module 121. The Wake-Up interface may be an interrupt pin used for the second processing module 121 to awaken the carrier transmission module 123, or for the carrier transmission module 123 to awaken the second processing module 121. The carrier transmission module 123 may typically selected as an AS3935® chip from ADVANCED MICRO SYSTEMS, INC. (AMS), which has an operating voltage of 2.4-3.6V. The wearable device 12 may further comprise an antenna L1 and a matching circuit 125, which are connected to the carrier transmission module 123. The matching circuit 125 may comprise a resistor R1 and a capacitor C1, each connected to the antenna L1 in parallel. The antenna L1 may be connected respectively to an INP and an INN interface, and may be configured to transmit the encrypted payment-permitted instruction. The antenna L1 may typically have a size smaller than 10*3 mm.

The mobile device 11 may receive the encrypted payment-permitted instruction from the wearable device 12, specifically, the first processing module 111 may receive via the ASK receiving module 113 the encrypted payment-permitted instruction from the carrier transmission module 123. The mobile device 11 may attempt to decrypt the encrypted payment-permitted instruction, namely, the first processing module 111 may try to decrypt the encrypted payment-permitted instruction. The mobile device 11 may determine whether the encrypted payment-permitted instruction is decrypted correctly, if positive, the mobile device 11 can be allowed to make a payment; otherwise it will not be permitted to make a payment.

The ASK receiving module 113 may comprise a receiver chip 115, a clock circuit 116, and an antenna L2. The receiver chip 115 may be configured to receive the encrypted payment-permitted instruction and transfer it to the first processing module 111 for decryption. The clock circuit 116 may be connected to an XIN and an XOUT interface of the receiver chip 115, and may be configured for time synchronization with the mobile device 11 to ensure the accuracy of the receiving time. The antenna L2 may be connected to an LFP interface and an LFN interface of the receiver chip 115, and may be configured to receive the encrypted payment-permitted instruction. The ASK receiving module 113 may further comprise a matching circuit 117 matched to the antenna L2. The matching circuit 117 may comprise a resistor R2 and a capacitor C2, each connected to the antenna L2 in parallel. Typically, the ASK receiving module 113 may be selected as an AS3930® chip with an operating voltage of 2.4-3.6V from AMS, Inc.

The ASK receiving module 113 may be connected to the first processing module 111 via an SPI (Serial Peripheral Interface) interface, namely, an CS interface of the receiver chip 115 may be connected to an CS interface of the first processing module 111; an CLK interface of the receiver chip 115 may be connected to an CLK interface of the first processing module 111; a Data interface of the receiver chip 115 may be connected to a Data interface of the first processing module 111; and a Wake-Up interface of the receiver chip 115 may be connected to a Wake-Up interface of the first processing module 111. After the ASK receiving module 113 receives the encrypted payment-permitted instruction, the receiver chip 115 may awaken through the Wake-Up interface the first processing module 111 to a working state. The first processing module 111 may obtain the encrypted payment-permitted instruction from the receiver chip 115, and decrypt the encrypted payment-permitted instruction using a secret key. If the payment-permitted instruction can be decrypted correctly, the mobile device 11 may perform a mobile payment with a mobile payment platform 13 via wireless or wired network signals.

Optionally, the user can store in advance the payment information into the first storage module 114 of the mobile device 11. The mobile device 11 can transmit via the first communication module 112 the payment information to the wearable device 12, so that the payment information can also be stored in the second storage module 124 and used to authenticate a user's identity information. If the user has multiple accounts, the wearable device 12 can perform authentication with the multiple accounts respectively, with an associated structure configured as follows.

```
/* Record bonding   identif information. */
typedef struct {
    /** set to sizeof(PayInfo) */
    stPhbData *PayList;
    int Pay Number
    ... ...
} Pay Info;
```

Wherein, the Paylist is a linked list recording multiple payers. The linked list structure can perform dynamic memory allocation (malloc) according to actual requirements to adjust to a desired size. The type of each member may be identical with that of the address book, both set to be "stPhbData". The PayNumber may record a number of the contacts.

Optionally, the wearable device 12 may receive through the second communication module 122 the payment instruction, for example, the user may make a payment or prepayment using a mobile phone-the wearable device 12 may thus obtain the user's payment account and password from the payment instruction, and decrypt the user's identity information using a secret key, and further generate a verification result using, an encryption algorithm and transmit it to the mobile device 11. The specific implementation can be as follows.

The second processing module 121 can provide a software interface function: Int user_identify (identify_type type);

This function may be used to examine whether the user's identity information can be found in the users already stored, where the parameter "type" may be an enumerated type comprising mainly two values: "Yes" and "No".

This function may be also an entrance for change of intelligent prompt modes.

In the function different function interfaces may be called according to different incoming parameters (user state parameters).

If the incoming user state parameter is "Yes", a decryption algorithm and decryption result may be called to the mobile device 11 as follows:

Int wearable_decode_control(decode); this function may be used to decrypt the information received by the wearable device 12;

Int wearable_decode_result(result); this function may be used to send the decryption result to the wearable device 12.

If the incoming user state parameter is "No", a verification result function may be directly called and transmitted to the mobile device 11:

Int wearable_decode_wrong_result(result);

Optionally, when the wearable device 12 verifies that the user's identity information is incorrect, it may transmit a payment-not-permitted instruction directly to the mobile device 11. If the wearable device 12 verifies that the user's identity information is correct, the mobile device 11 may receive an encrypted payment-permitted instruction from the wearable device 12, and decrypt it using a secret key, and only when the decryption result is consistent with the result transmitted from the wearable device 12 will the payment be permitted, otherwise not permitted. The specific implementation can be as follows.

The mobile device 11 can provide a software interface function: Int user_identify_result (result_type);

This function may be used to indicate whether the identity information is correct, where the parameter "type" may be an enumerated type comprising mainly two values: "Yes" and "No".

This function is also an entrance for change of intelligent prompt modes. In the function different function interlaces may be called according to different incoming parameters (user state parameters).

If the incoming parameter is "Yes", a decryption algorithm may be called, and the decrypt result may be compared against the decryption result of the wearable device 12, if they are consistent, the payment-permitted instruction will be called:

Function Int handset_decode_control(decode) may be used to decrypt the information received by the wearable device 12;

Function Int compare_result(result) may be used to compare the results of the mobile device 11 and the wearable device 12; and Function Int Pay_result(paytype_type) may be used to indicate whether to make the payment, where the parameter "type" may be an enumerated type comprising mainly two values: "Yes" and "No".

If the incoming user state parameter is "No", the payment-not-permitted instruction will be directly called:

Int Pay_result(paytype_type).

According to the current embodiment, the mobile device 11 can transmit a payment instruction to the wearable device 12, which may verify whether the user's identity information is correct; if positive, the wearable device 12 can generate a payment-permitted instruction and encrypt the payment-permitted instruction by a secret key; the wearable device 12 can further transmit the encrypted payment-permitted instruction to the mobile device 11, which can then attempt to decrypt the encrypted payment-permitted instruction, if the payment-permitted instruction is correctly decrypted, the mobile device 11 can make a payment. Thus, the present disclosure can effectively enhance the security of payment information in mobile payment.

Figure 2:
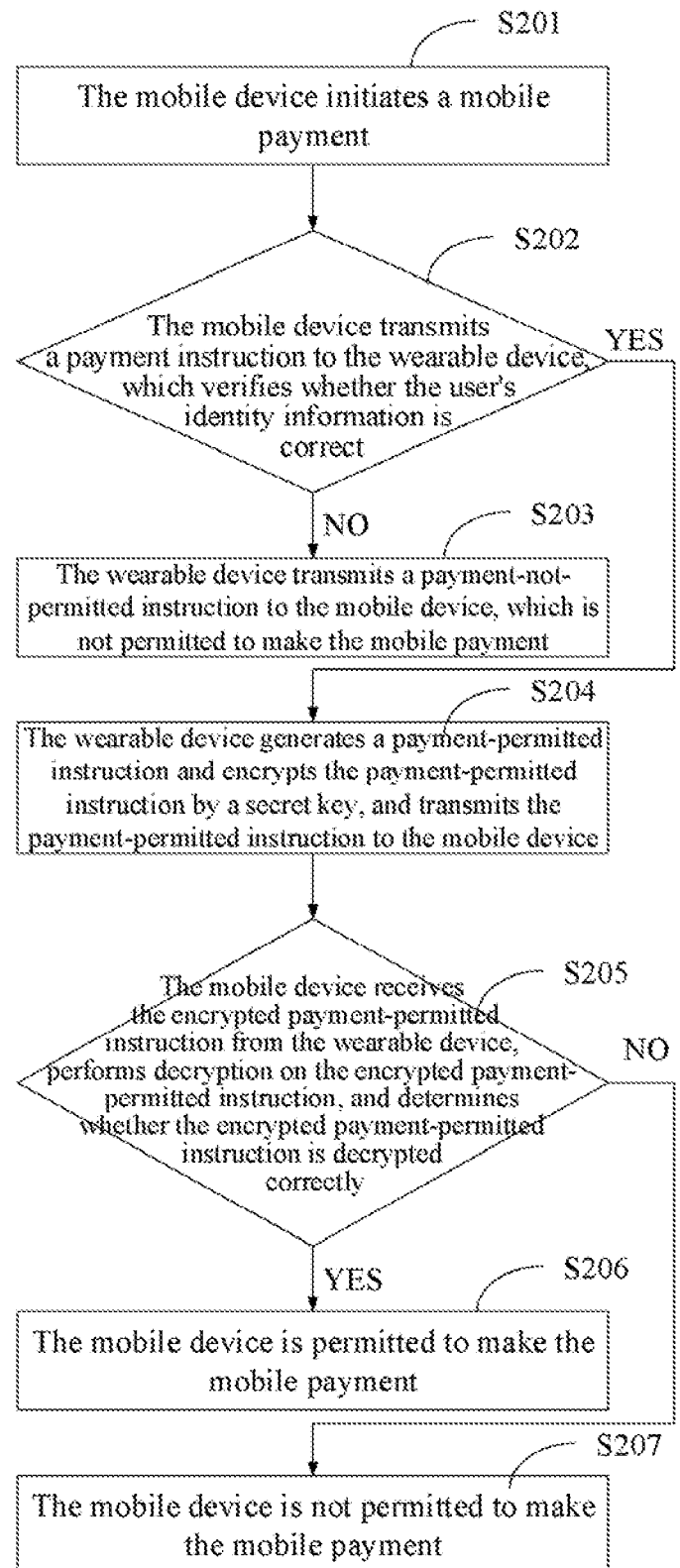
FIG. 2 shows a flowchart illustrating a mobile payment method according to an embodiment of the disclosure.

A mobile payment method is further disclosed. The mobile payment method can be implemented in the mobile payment system 1 according to the embodiment described above. Referring now to FIG. 2, the mobile payment method may comprise the following steps.

In a first step S201, the mobile device 11 may initiate a mobile payment.

To perform the mobile payment, the mobile device 11 may awaken the wearable device 12 through an interrupt signal. The method may proceed to step S202.

In the following step S202, the mobile device 11 may transmit a payment instruction to the wearable device 12, which may verify the user's identity information according to the payment instruction.

The wearable device 12 may compare the user identity information present in the payment instruction against the payment information stored in the wearable device 12. If no match is found, namely, the wearable device 12 verities that the user's identity information is incorrect, a following step S203 may be entered into. If the wearable device 12 verifies that the user's identity information is correct, a following step S204 may be entered into.

In the step S203, the wearable device 12 may transmit a payment-not-permitted instruction to the mobile device 11, which then may be not permitted to make a mobile payment.

In the step S204, the wearable device 12 may generate a payment-permitted instruction and encrypt the payment-permitted instruction by a secret key, and transmit the encrypted payment-permitted instruction to the mobile device 11.

The wearable device 12 may awaken the mobile device 11 using an interrupt signal before transmitting the encrypted payment-permitted instruction to the mobile device 11. The method may continue to step S205.

In the following step S205, the mobile device 11 may receive the encrypted payment-permitted instruction from the wearable device 12 and decrypt the encrypted payment-permitted instruction, and determine whether the encrypted payment-permitted instruction is decrypted correctly.

If positive, a following step S206 may be turned to. Otherwise, if negative, a following step S207 may be turned to.

In the step S206, the mobile device 11 may be permitted to perform a mobile payment.

In the step S207, the mobile device 11 may be not permitted to make a mobile payment.

To conclude, according to the present disclosure, the mobile device 11 can transmit a payment instruction to the wearable device 12, which may verify whether the user's identity information is correct; if positive, the wearable device 12 can generate a payment-permitted instruction and encrypt the payment-permitted instruction by a secret key; the wearable device 12 can transmit the encrypted payment-permitted instruction to the mobile device 11, which can then attempt to decrypt the encrypted payment-permitted instruction, if the payment-permitted instruction is correctly decrypted, the mobile device 11 can make a payment. Thus, the present disclosure can effectively enhance the security of payment information in mobile payment.

The above description is merely some exemplary embodiments of the disclosure, but is not meant to limit the scope of the disclosure. Any equivalent structures or flow transformations made to the disclosure, or any direct or indirect applications of the disclosure on other related fields, shall all be covered within the protection of the disclosure.

The invention claimed is:

1. A mobile payment system, comprising a wearable device and a mobile device wirelessly connected to the wearable device, wherein the mobile device transmits a payment instruction to the wearable device, and the wearable device determines whether a user's identity information stored in the payment instruction is correct;

when the wearable device determines the user's identity information is correct, the wearable device generates a payment-permitted instruction, and encrypts the payment-permitted instruction by a secret key; the payment-permitted instruction is configured to permit the mobile device to make a payment; and the wearable device further transmits the encrypted payment-permitted instruction to the mobile device, and the mobile device decrypts the encrypted payment-permitted instruction and determines whether the decrypted payment-permitted instruction is correct; when the decrypted payment-permitted instruction is correct, the mobile device makes a payment;

wherein the mobile device comprises a first communication module and an ASK (Amplitude-shift keying) receiving module, and the wearable device comprises a second communication module and a carrier transmission module;

the payment instruction is transmitted from the first communication module of the mobile device to the second communication module of the wearable device; and the encrypted payment-permitted instruction is transmitted from the carrier transmission module of the wearable device to the ASK receiving module of the mobile device.

2. The mobile payment system according to claim 1, wherein the mobile device comprises a first processing module and a first communication module connected to the first processing module, wherein the first processing module transmits via the first communication module the payment instruction to the wearable device.

3. The mobile payment system according to claim 2, wherein the wearable device comprises:
   a second communication module configured to receive the payment instruction from the first communication module;
   a second processing module connected to the second communication module and configured to determine whether the user's identity information is correct, when positive, the second processing module generates the payment-permitted instruction, and encrypts the payment-permitted instruction by a secret key; and
   a carrier transmission module connected to the second processing module and configured to transmit the encrypted payment-permitted instruction to the mobile device.

4. The mobile payment system according to claim 3, wherein the receiving module is connected to the first processing module and configured to receive the encrypted payment-permitted instruction from the carrier transmission module.

5. The mobile payment system according to claim 4, wherein the first processing module performs decryption on the encrypted payment-permitted instruction, and when the decrypted payment-permitted instruction is correct, the mobile device makes the payment.

6. The mobile payment system according to claim 4, wherein the carrier transmission module transmits the encrypted payment-permitted instruction to the ASK receiving module using a low frequency signal of 125 KHz.

7. The mobile payment system according to claim 3, wherein the carrier transmission module comprises an interrupt pin, through which the second processing module awakens the carrier transmission module.

8. The mobile payment system according to claim 5, wherein the wearable device is further configured to store payment information transmitted from the mobile device;
   the second processing module is configured to provide a software interface function configured to examine whether the user's identity information stored in the payment instruction matches with the payment information, and call a corresponding function interface according to an incoming user state parameter;
   when the incoming user state parameter is "Yes", the second processing module is configured to decrypt the user's identity information, and send a first decryption result to the wearable device.

9. The mobile payment system according to claim 8, wherein when the first processing module performs decryption on the encrypted payment-permitted instruction, a second decryption result is generated;
   the mobile device determines whether the decrypted payment-permitted instruction is correct by determining whether the second decryption result is consistent with the first decryption result by the first processing module; based on the second decryption result is consistent with the first decryption result, the mobile device makes the payment.

10. The mobile payment system according to claim 3, wherein the carrier transmission module is connected to the second processing module via an I2C interface;
    wherein a clock (CLK) interface of the carrier transmission module is connected to a CLK interface of the second processing module; a Data interface of the carrier transmission module is connected to a Data interface of the second processing module; a Wake-Up interface of the carrier transmission module is connected to a Wake-Up interface of the second processing module; the Wake-Up interface is an interrupt pin used for the second processing module to awaken the carrier transmission module, or for the carrier transmission module to awaken the second processing module.

11. The mobile payment system according to claim 4, wherein the ASK receiving module comprises a receiver chip; wherein after the ASK receiving module receives the encrypted payment-permitted instruction, the receiver chip awakens the first processing module, and the first processing module obtains the encrypted payment-permitted instruction from the receiver chip.

12. The mobile payment system according to claim 11, wherein the ASK receiving module further comprises a receiver chip; wherein an CS (Chip Select) interface of the receiver chip is connected to an CS interface of the first processing module; a CLK interface of the receiver chip is connected to an CLK interface of the first processing module; a Data interface of the receiver chip is connected to a Data interface of the first processing module; a Wake-Up interface of the receiver chip is connected to a Wake-Up interface of the first processing module.

* * * * *